United States Patent Office 3,338,747
Patented Aug. 29, 1967

3,338,747
FUEL CELL SYSTEM WITH PRESSURE
PULSE GENERATOR
Heinz Günther Plust, Spreitenbach, and Carl Georg
Telschow, Zurich, Switzerland, assignors to Aktiengesellschaft Brown, Boveri & Cie., Baden, Switzerland, a
joint-stock company
Filed Aug. 19, 1963, Ser. No. 302,816
Claims priority, application Switzerland, Aug. 27, 1962,
10,165/62; May 27, 1963, 6,583/63
11 Claims. (Cl. 136—86)

This invention relates to apparatus for the operation of a fuel cell having gas diffusion electrodes disposed in pairs acting as anode and as cathode and in contact with an electrolyte for the electrochemical reaction of hydrogen and oxygen or air.

It is a necessary condition for the economic operation of a fuel cell that the fuel gas undergoes complete electrochemical reaction. Electrodes are known which are homoeoporous or have been rendered hydrophobic, and which comprise one or a plurality of strata in order to fulfill this requirement. The gas required for the reaction is supplied to the electrode, for example, at constant pressure by means of a blind pipe. A further possibility is that the gas stream can be swept over the electrode at constant pressure, unreacted gas being recirculated to the electrode.

Under industrial conditions, however, these conventional arrangements have several disadvantages. For one thing, the manufacture of homoeoporous electrodes particularly, involves great technological difficulties. Another unfavourable feature of the conventional arrangement is that the triphase boundaries which are necessary for the electrochemical reaction develop in the interior or on the gas side of the pore system of the electrode. Since water is formed at the triphase boundary—of a hydrogen/nickel electrode, for example—in accordance with the electrochemical reaction, the concentration of hydroxyl ions which is responsible for the conductance diminishes sharply in that portion of the electrolyte present in the interior of the pores. A reduction of this concentration gradient can be produced by diffusion only, which on the one hand takes place slowly in the case of low-temperature cells, and on the other hand produces only an extremely incomplete leveling out in the case of heavy load conditions and a correspondingly high formation of water per unit time. The over-voltage at the electrode consequently rises, involving a substantial deterioration of the electrochemical performance characteristic of the electrode. Similarly, the modification of the pH value of the electrolyte which occurs with the formation of water may result in poisoning of the active centres of the internal electrode surface, and thus again exert a considerable unfavourable influence upon the properties of the electrode.

Lastly, the deterioration of the electrochemical properties of the electrode can also be caused by a process beginning at the gas side. This occurs when, the electrode being under heavy load, the transport of the hydrogen gas by diffusion to the triphase boundary, which is always located in the same position in the case of the electrode referred to, becomes effective for determining the speed of the electrochemical reaction. The consequence again is an increase of the over-voltage at the electrode. The same effect is caused by the presence of foreign gases in the fuel gas. The foreign gases accumulate in front of the triphase boundary where they may produce a poisoning of the active centres. If the formation of the gas cushion becomes excessive, ultimately no further electrochemical reaction will take place in the pores. All these disadvantages arise with the conventional electrodes, irrespective of whether they are operated as anode or as cathode in a fuel cell.

It is the object of the present invention to obviate the disadvantages mentioned above and to provide an arrangement of apparatus which permits operating under optimum electrochemical conditions and with at least approximately total conversion of the gas for any load under which the cell may be operated.

The arrangement of apparatus which has gas diffusion electrodes disposed in pairs acting as anode and as cathode and in contact with an electrolyte for the electrochemical reaction of hydrogen and oxygen or air is characterized by the fact that each gas necessary for the reaction is drawn from a reservoir and flows partially through the pores of the corresponding electrode which have a maximum diameter of $100\mu$, and is fed back by a circulating device connected to the gas outlet side of the electrode to the gas inlet side of the electrode, a pressure pulse generator being arranged in the gas circuit to generate periodic pressure surges superimposed upon the pressure drop at the electrode.

The invention will now be described in detail with reference to the accompanying drawing, wherein.

Figure 1:
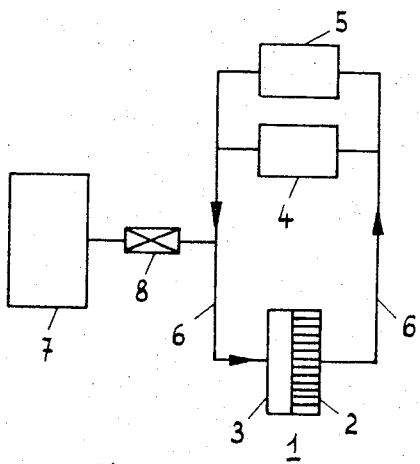
FIG. 1 illustrates the invention diagrammatically, by the example of a single electrode of a fuel cell.

FIG. 1 illustrates the arrangement schematically with reference to only one of the electrodes which normally are arranged in pairs in the fuel cell. 1 designates the porous electrode, which consists in conventional manner of the electrode body 2 and of the gas supply compartment 3 and normally is in contact with the electrolyte, not shown. The electrode is supplied with the gas in the direction of the arrow. The gas which partially emerges through the pores on the other side of the electrode body is fed back through the circulating device 4 in a circuit 6 to the gas supply compartment 3 of the electrode. Due to the circulation of the gas in the circuit 6, a pressure drop $\Delta p_1$ will exist between the two sides of the electrode. On this constant pressure drop, periodic pressure surges are superimposed, being generated by the pressure pulse generator 5 in the gas circuit 6, so that an intermittent higher pressure drop $\Delta p_2$ is produced at the electrode.

The reservoir 7 serves to replace the gas which has reacted electrochemically in the electrode, and is conveniently connected to the gas circuit 6 by the control valve 8. If the electrode is operated at a specific gas pressure range having an upper and a lower limiting value, then the gas circuit 6 is charged to the upper working pressure through the valve 8. When the pressure in the gas circuit has fallen to the lower working value as a result of the electrochemical reaction, the valve 8 is again opened—for example, by means of a pressure sensitive switch not shown—until the pressure has once more attained the upper value.

The processes which take place in the interior of the electrode in the case of this arrangement may be described as follows:

In the pore system, pores are continually blown clear at the frequency of the pressure surges, and fresh equilibrium adjustments are subsequentially effected in these pores. For the majority of the pores, the dilution of the electrolyte and the formation of foreign gas cushions will not take place. In other pores, the triphase boundary is shifted to and fro by the pressure surges. Due to the shifting of the triphase boundary, the electrolyte in the pores is agitated so that it is impossible for a concentration gradient to build up in these pores.

Furthermore, gas flows continuously—that is to say, in the time intervals between the pressure surges—through certain pores. This produces an injector effect at the branch junctions in the vicinity of those pores through which a continuous flow passes. The consequence of this is that the electrolyte and also the foreign gases are constantly sucked out of the branched pores, so that the reaction products—for instance, water—produced at the triphase boundary in the pores cannot cause a deterioration of the electrochemical properties of the electrode.

A further advantage of the arrangement according to the invention is due to the fact that the reaction gas is passed in a circuit whereby total reaction of the gas is achieved with simultaneous maintenance of the optimum electrochemical properties of the electrode. Since the condition for fabricating the electrode can be met with comparatively small technological expense—the essential requirement being an upper limit of 100μ for the diameter of the pores—economic manufacture of the electrodes is insured.

Lastly, the arrangement exhibits the advantage that the gas flowing through the electrode mixes the electrolyte in the fuel cell and favorably promotes convection of the electrolyte.

Figure 2:
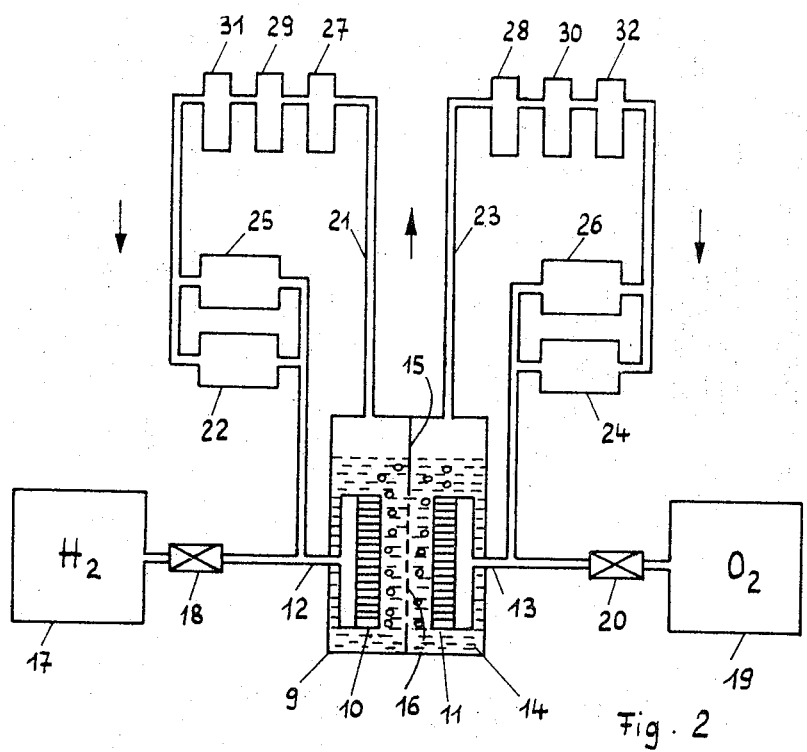
FIG. 2 shows an exemplary arrangement of the apparatus associated with a fuel cell.

FIG. 2 shows an exemplary arrangement of apparatus with a fuel cell. 9 designates the vessel in which the porous hydrogen electrode 10 (anode) and the porous oxygen electrode 11 (cathode) are fitted, together with their mountings (not shown) and gas conduits 12 and 13. The vessel is more than half full of the electrolyte 14—for example, caustic potash solution. It is convenient to separate the anode and cathode compartments by a wall 15 impermeable to gas, which in order to reduce the internal resistance of the cell consists in the region of the electrodes of a diaphragm 16 of—for example, a fine-meshed wire gauze or a porous plastic sheet connected to the electrodes.

17 designates the hydrogen reservoir, which is connected by a control valve 18 to the gas supply conduit 12 for the hydrogen electrode. In the same way, the oxygen reservoir 19 is connected by the control valve 20 to the gas supply conduit 13 for the oxygen electrode.

The gas which has not reacted in the pores of the electrodes flows through the said pores and the electrolyte and is directed by the circulating device 22 or 24 through the gas outlet conduit 21 or 23 and back to the gas inlet side (conduit 12 or 13) of the electrodes. The two gas circuits also contain the pressure pulse generators 25 and 26, which generate pressure surges superimposed upon the pressure drop at the electrodes. The circulating device 22 or 24 and the pressure pulse generator 25 or 26 need not be separate devices. It is on the contrary convenient to combine the two devices in an intermittent-acting pump—for example, in a diaphragm pump or plunger pump. One example of a suitable pulse frequency is a rate of 20 surges per minute.

The circuit is brought to the upper working pressure from the reservoir 17 or 19 through the valve 18 or 20 in the manner already described, whenever the pressure in the system falls to its lower limit. Because pressure differentials alone are critical for the operation of the electrode, the minimum pressure in the gas circuit may be chosen independently of the ambient pressure. It is convenient to determine the minimum pressure higher than the ambient pressure, because the arrangement of the gas circuit is simplified in this case. The pressure in the gas circuit therefore fluctuates—for example between 0.5 and 1 at superatmospheric pressure as minimum and maximum working pressures.

The water formed by the electrochemical reaction can be removed in simple manner by including a water separator 27 or 28 in each gas circuit. Also, from considerations of safety, an oxygen eliminator 29 may be arranged in the hydrogen circuit and correspondingly a hydrogen eliminator 30 in the oxygen circuit. And in the same manner, the foreign gas eliminators 31 and 32 may be provided in the gas circuits in order to eliminate other disturbing gases. A further advantage of the arrangement resides in the fact that the circulating gas current removes water and heat from the electrolyte.

If air, which is considerably cheaper, is brought to reaction at the cathode instead of oxygen, then it is convenient to dispense with the gas circuit for the cathode section and to pass the air which flows through the pores of the electrode 11 and through the electrolyte directly to the atmosphere, possibly after previous water separation. In this case, the circulating device 24, the pressure pulse generator 26 and the gas eliminators 30 and 32 are dispensed with.

Figure 3:
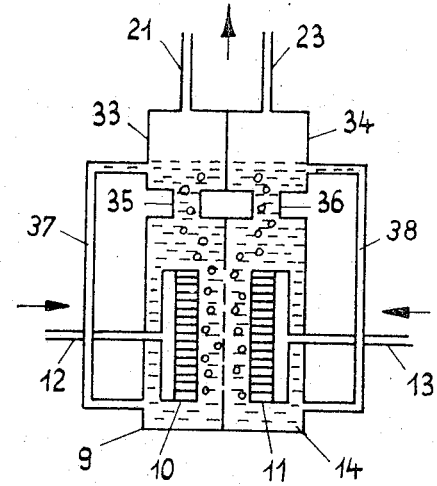
FIG. 3 shows another construction of the fuel cell.

FIG. 3 shows another construction of the fuel cell. The anode 10, to which hydrogen is supplied via the conduit 12, and the cathode 11, to which oxygen is supplied via the conduit 13, are in contact with the electrolyte 14 present in the vessel 9 similar to the arrangement shown in FIG. 2. Above the vessel 9 are chambers 33 and 34 containing the electrolyte which surrounds the anode and cathode. These chambers 33 and 34 are connected to the vessel 9 by constricted portions 35 and 36. To these chambers 33 and 34, the gas outlet conduits 21 and 23 are connected. The remaining parts of the arrangement shown in FIG. 2, but not shown in FIG. 3, are located between the gas outlet conduits 21 and 23 and the gas supply conduits 11 and 13. The gas rising through the electrolyte carries the electrolyte through the constricted portions 35 and 36 into the chambers 33 and 34. From the latter, the electrolyte flows back through the conduit 37 and 38 into the vessel 9. Due to the fact that the electrolyte is passed in circuit by reason of the gas movement, thorough mixing of the electrolyte is obtained.

It is advantageous, in the case of the arrangements according to FIGS. 2 and 3, so to dimension the gas spaces above the electrolyte, in which the segregation of gas and electrolyte occurs, that pressure fluctuations between the anode and the cathode compartments are equalized by the electrolyte.

A further arrangement makes it possible for the fuel cell, which is normally provided for the generation of electrical energy, to be used for electrolysis in a simple and economical manner. If the current flow in the load circuit of the fuel element is reversed, gas—i.e., hydrogen and oxygen—is generated at the electrodes by electrolysis. This is the case, for example, if the fuel cell is provided to supply electric power and recuperation of energy is desired during braking. Another possible application lies in the use of the fuel cell as a generator of peak load energy for delivery to an electrical supply system, so that electrical energy is delivered back to the fuel cell when the load upon the system is small. The arrangement according to the invention not only prevents a pressure rise in the gas circuit during electrolysis operation; the gases generated are also stored and are thus available for subsequent reaction in the same fuel cell in order to generate electrical energy.

In the case of this further arrangement, the gas reservoir is connected to the gas outlet side of the electrode through a first controlled valve, and a compressor is connected to the gas reservoir through a second controlled valve, the two valves being controlled by means of a pressure sensitive switch arranged on the gas outlet side in such a way that the first valve is opened when the pressure has fallen to the lower working pressure and the second valve is opened when the pressure exceeds the upper working pressure.

The arrangement will be described in detail with reference to FIG. 4.

40 designates the porous gas diffusion electrode, for example, the hydrogen electrode, acting as anode in the fuel cell and is provided with a gas supply conduit 41. The electrode is immersed in the electrolyte 43—for example, caustic potash solution—in the vessel 42. The wall 44 impermeable to gas is positioned in the centre of the vessel, and divides the anode compartment from the adjoining cathode compartment—not shown—in which the oxygen electrode is fitted. The cathode compartment is further provided with the gas outlet conduit 45. The electrode is connected to the external load, not shown, by the electrical conductor 46.

The gas which has not reacted in the pores of the electrode 40 passes through the pores, flows through the electrolyte 43 and is forced by the circuating device 47 through the gas outlet conduit 45 and fed back to the gas inlet side (conduit 41). At the side of the circulating device 47 there is arranged the pressure pulse generator 48 by which the pressure surges are generated which are superimposed upon the pressure drop at the electrode and which continually blow the pores free of electrolyte. The circulating device 47 and the pressure pulse generator 48 may also be combined in a single device—for example, in a diaphragm pump or plunger pump. A water separator 49, an oxygen eliminator 50 and a foreign gas eliminator 51 are further advantageously disposed in the gas circuit.

52 designates the reservoir for the hydrogen gas, which is connected by the control valve 53 to the gas outlet side of the electrode. The gas outlet side is further connected, via a second control valve 54, to a compressor 55, which in turn is connected to the gas reservoir 52. In order to control the valves, a pressure sensitive switch 56 is provided, which is likewise connected to the gas outlet side of the electrode and—for example—has contacts which are actuated for specific adjustable pressures and which actuate the valves electromagnetically by closing or opening electrical circuits.

When hydrogen gas is consumed by the delivery of electrical current to the external load, the gas pressure falls if the valve 53 is closed. As soon as the pressure has fallen to the lower service value, the valve 53 is opened by means of the pressure sensitive switch 56 until the pressure in the gas circuit has risen to the upper working pressure. Conversely, when current is fed into the electrode from the external load, a strong gas development occurs in the fuel element by electrolysis—i.e., a hydrogen development in the present case. This causes the pressure in the gas circuit to rise above the upper working pressure. The pressure sensitive switch 56 opens the valve 54 and switches on the compressor 55, so that the hydrogen gas generated is stored in the reservoir 52.

Figure 4:
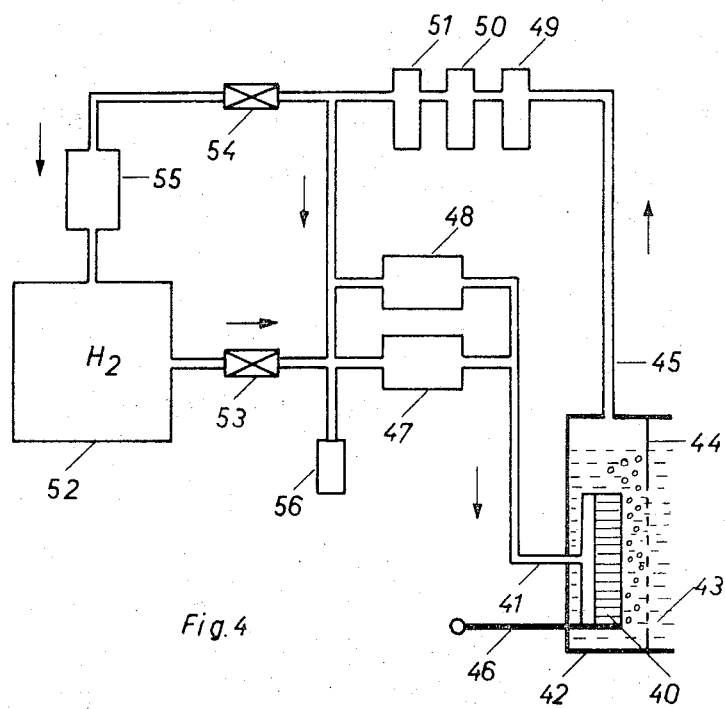
FIG. 4 shows a further arrangement of the apparatus.

The same arrangement is also advantageously provided for the oxygen circuit which is not shown in FIG. 4.

We claim:

1. Apparatus for operating a fuel cell comprising a vessel, an electrolyte in said vessel, a pair of hollow diffusion electrodes acting as an anode and a cathode in contact with said electrolyte for the electro chemical reaction of hydrogen and oxygen or air, and gas-impermeable means separating said electrodes, said vessel including outlets for the hydrogen and oxygen or air effluent, a gas circuit for each electrode, each gas circuit communicating with one outlet of the vessel and with the interior of one of said hollow electrodes, each gas circuit including a gas circulating device including a pressure pulse generator.

2. Apparatus as defined in claim 1 comprising a gas reservoir connected to each circuit by a conduit, a pressure controlled valve in the conduit connecting each reservoir with each gas circuit, said valves being operable to maintain the gas pressure in each circuit within a predetermined range.

3. Apparatus as defined in claim 1 in which each of said pressure pulse generators is an intermittently acting pump.

4. Apparatus as defined in claim 1 in which said gas impermeable means is a gas impermeable wall in said vessel separating the same into anode and cathode compartments.

5. Apparatus as defined in claim 4 in which at least that portion of said wall in the region of said electrodes in said electrolyte is a diaphragm.

6. Apparatus as defined in claim 4 comprising a chamber connected to the upper end of each compartment through a restricted passageway and a conduit connecting each chamber with the respective compartment of said vessel, said gas circuits including said chambers.

7. Apparatus as defined in claim 6 in which said chambers are so dimensioned that the pressure fluctuations between the anode and cathode compartments are equalized by the electrolyte.

8. Apparatus as defined in claim 1 in which each gas circuit includes a water separator.

9. Apparatus as defined in claim 1 in which each gas circuit includes a foreign gas eliminator.

10. Apparatus as defined in claim 1 in which the hydrogen gas circuit includes an oxygen eliminator and the oxygen gas circuit includes a hydrogen eliminator.

11. Apparatus as defined in claim 1 which comprises a gas reservoir connected to each gas circuit by a first conduit communicating with the gas outlet side of the respective electrodes, a first gas control valve in each of said first conduits, a second conduit connecting the gas circuit of each electrode at the gas outlet side thereof with the respective gas reservoir, a second gas control valve in each of said second conduits, a compressor in each of said second conduits between said second gas control valves and said reservoirs and pressure sensitive means connected to both of said gas control valves for opening said first valve when the pressure in the gas circuit goes below a predetermined value and for opening said second valve when the pressure in the gas circuit exceeds a predetermined maximum.

References Cited

UNITED STATES PATENTS

| | | | |
|---|---|---|---|
| 668,838 | 2/1901 | Lavison | 136—86 |
| 2,947,797 | 8/1960 | Justi et al. | 136—86 |
| 3,002,039 | 9/1961 | Bacon | 136—86 |
| 3,014,976 | 12/1961 | Blackmer | 136—86 |
| 3,133,837 | 5/1964 | Eidensohn | 136—86 |
| 3,198,664 | 8/1965 | Kunz | 136—86 |

FOREIGN PATENTS

| | | |
|---|---|---|
| 616,031 | 3/1961 | Canada. |

WINSTON A. DOUGLAS, *Primary Examiner.*

ALLEN B. CURTIS, *Examiner.*